(12) United States Patent
Chen et al.

(10) Patent No.: US 10,699,139 B2
(45) Date of Patent: Jun. 30, 2020

(54) SYSTEM FOR REAL-TIME OBJECT DETECTION AND RECOGNITION USING BOTH IMAGE AND SIZE FEATURES

(71) Applicant: HRL Laboratories, LLC, Malibu, CA (US)

(72) Inventors: Yang Chen, Westlake Village, CA (US); Deepak Khosla, Camarillo, CA (US); Ryan M. Uhlenbrock, Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/276,513

(22) Filed: Feb. 14, 2019

(65) Prior Publication Data

US 2019/0180119 A1 Jun. 13, 2019

Related U.S. Application Data

(63) Continuation-in-part of application No. 15/883,822, filed on Jan. 30, 2018.
(Continued)

(51) Int. Cl.
*G06K 9/00* (2006.01)
*G06K 9/32* (2006.01)
(Continued)

(52) U.S. Cl.
CPC ..... *G06K 9/00805* (2013.01); *G06K 9/00744* (2013.01); *G06K 9/3233* (2013.01);
(Continued)

(58) Field of Classification Search
None
See application file for complete search history.

(56) References Cited

U.S. PATENT DOCUMENTS 7,409,372 B2* 8/2008 Staelin ............ G06N 3/08
706/15
8,265,392 B2* 9/2012 Wang ............ G06K 9/00248
382/173
(Continued)

FOREIGN PATENT DOCUMENTS

CN 105913003 A 8/2016
CN 107092883 A 8/2017
(Continued)

OTHER PUBLICATIONS

Verma, Ankit, et al. "Pedestrian detection via mixture of CNN experts and thresholded aggregated channel features." Proceedings of the IEEE International Conference on Computer Vision Workshops. 2015. (Year: 2015).*
(Continued)

*Primary Examiner* — Michelle M Entezari
(74) *Attorney, Agent, or Firm* — Tope-McKay & Associates

(57) ABSTRACT

Described is an object recognition system. Using an integral channel features (ICF) detector, the system extracts a candidate target region (having an associated original confidence score representing a candidate object) from an input image of a scene surrounding a platform. A modified confidence score is generated based on a location and height of detection of the candidate object. The candidate target regions are classified based on the modified confidence score using a trained convolutional neural network (CNN) classifier, resulting in classified objects. The classified objects are tracked using a multi-target tracker for final classification of each classified object as a target or non-target. If the classified object is a target, a device can be controlled based on the target.

21 Claims, 13 Drawing Sheets

Related U.S. Application Data

(60) Provisional application No. 62/479,204, filed on Mar. 30, 2017, provisional application No. 62/659,100, filed on Apr. 17, 2018.

(51) Int. Cl.
  G06K 9/46 (2006.01)
  G06K 9/62 (2006.01)
  G06N 3/08 (2006.01)

(52) U.S. Cl.
  CPC .......... G06K 9/3241 (2013.01); G06K 9/469 (2013.01); G06K 9/6274 (2013.01); G06K 9/6292 (2013.01); G06N 3/08 (2013.01)

(56) References Cited

U.S. PATENT DOCUMENTS

| | | | |
|---|---|---|---|
| 9,443,320 | B1 | 9/2016 | Gaidon |
| 9,704,047 | B2* | 7/2017 | Shima ................... G08G 1/166 |
| 10,297,026 | B1* | 5/2019 | Jordan ................. G06K 9/6211 |
| 10,353,271 | B2* | 7/2019 | Wang ..................... G03B 13/30 |
| 10,402,987 | B2* | 9/2019 | Chen ................. G06K 9/00744 |
| 10,482,607 | B1* | 11/2019 | Walters ...................... G06F 8/71 |
| 10,546,209 | B2* | 1/2020 | Lee ...................... G06K 9/6267 |
| 2010/0021010 | A1 | 1/2010 | Zhang et al. |
| 2016/0343146 | A1* | 11/2016 | Brown .................... G06K 9/481 |
| 2017/0099200 | A1 | 4/2017 | Ellenbogen |
| 2017/0124415 | A1 | 5/2017 | Choi |
| 2017/0364757 | A1 | 12/2017 | Rajabizadeh et al. |
| 2018/0005079 | A1* | 1/2018 | Tosic ................. G06K 9/00664 |
| 2019/0130215 | A1* | 5/2019 | Kaestle .............. G06K 9/00771 |

FOREIGN PATENT DOCUMENTS

| | | | |
|---|---|---|---|
| KR | 10-2015-0017762 A | 2/2015 | |
| WO | WO2017182225 | 10/2017 | |
| WO | WO-2017182225 A1 * | 10/2017 | ......... G06K 9/00771 |

OTHER PUBLICATIONS

Du X, El-Khamy M, Lee J, Davis L. Fused DNN: A deep neural network fusion approach to fast and robust pedestrian detection. In2017 IEEE winter conference on applications of computer vision (WACV) Mar. 24, 2017 (pp. 953-961). IEEE. (Year: 2017).*

Liu, Jingchen, Robert T. Collins, and Yanxi Liu. "Surveillance camera autocalibration based on pedestrian height distributions." In British Machine Vision Conference (BMVC), vol. 2. 2011. (Year: 2011).*

Fu Z, Angelini F, Chambers J, Naqvi SM. Multi-level cooperative fusion of GM-PHD filters for online multiple human tracking. IEEE Transactions on Multimedia. Mar. 1, 2019 (Year: 2019).*

Li Y, Dou Y, Liu X, Li T. Localized region context and object feature fusion for people head detection. In2016 IEEE International Conference on Image Processing (ICIP) Sep. 25, 2016 (pp. 594-598). IEEE. (Year: 2016).*

Wang, Hongjun, Jiani Hu, and Weihong Deng. "Face feature extraction: a complete review." IEEE Access 6 (2017): 6001-6039. (Year: 2017).*

Dragon R., Van Gool L., "Ground plane estimation using a hidden Markov model", 27th IEEE conference on computer vision and pattern recognition—CVPR 2014, pp. 4026-4033, Jun. 23-28, 2014, Columbus, Ohio, USA.

G. Führ, C. R. Jung and M. B. d. Paula, "On the Use of Calibration for Pedestrian Detection in On-Board Vehicular Cameras," 2016 29th SIBGRAPI Conference on Graphics, Patterns and Images (SIBGRAPI), Sao Paulo, 2016, pp. 80-87., doi: 10.1109/SIBGRAPI.2016.020.

Notification of Transmittal of International Search Report and the Written Opinion of the International Searching Authority for PCT/US2019/018119; dated Jun. 12, 2019.

International Search Report of the International Searching Authority for PCT/US2019/018119; dated Jun. 12, 2019.

Written Opinion of the International Searching Authority for PCT/US2019/018119; dated Jun. 12, 2019.

P. Luo, X. Zeng, X. Wang, and X. Tang. Switchable deep network for pedestrian detection. CVPR, 2014, pp. 893-906.

W. Ouyang and X. Wang. Joint deep learning for pedestrian detection. ICCV, 2013, pp. 2056-2063.

A. Angelova, A. Krizhevsky, V. Vanhoucke, A. Ogale, D. Ferguson, Real-Time Pedestrian Detection With Deep Network Cascades, British Machine Vision Conference (BMVC), 2015, pp. 1-12.

Office Action 1 for U.S. Appl. No. 15/883,822, dated Oct. 9, 2019.

Dollar, P., et al., "Integral channel features," In: British Machine Vision Conference, vol. 2, 2009.

Chen X., et al., "Pedestrian detection with deep convolutional neural network," in Asian Conference on Computer Vision Nov. 1, 2014, pp. 354-365, Springer, Cham. (Year 2014).

Xu Y., et al., "Online discriminative structured output SVM learning for multi-target tracking," IEEE Signal Processing Letters, Jan. 9, 2014; 21(2): 190-4. (Year: 2014).

Verma, A., et al., 2015, "Pedestrian detection via mixture of CNN experts and thresholded aggregated channel features;" In Proceedings of the IEEE International Conference on Computer Vision Workshops pp. 163-171, (Year: 2015).

Brauer H., et al, "Robust false positive detection for real-time multi-target tracking," International Conference on Image and Signal Processing Jun. 30, 2014, pp. 450-459, Springer, Cham. (Year: 2014).

Ju J., et al., "Online multi-person tracking with two-stage data association and online appearance model learning," IET Computer Vision, Jul. 18, 2016; 11(1):87-95, (Year: 2016).

Response to Office Action 1 for U.S. Appl. No. 15/883,822 dated Feb. 6, 2020.

* cited by examiner

SYSTEM FOR REAL-TIME OBJECT DETECTION AND RECOGNITION USING BOTH IMAGE AND SIZE FEATURES

CROSS-REFERENCE TO RELATED APPLICATIONS

This application is a Continuation-in-Part application of U.S. application Ser. No. 15/883,822, filed on Jan. 30, 2018, which is a non-provisional application of U.S. Provisional Application No. 62/479,204, filed Mar. 30, 2017, the entirety of which are hereby incorporated by reference.

This application is ALSO a non-provisional patent application of U.S. provisional application Ser. No. 62/659,100, filed on Apr. 17, 2018, the entirety of which is hereby incorporated by reference.

GOVERNMENT RIGHTS

This invention was made with government support under U.S. Government Contract Number W15P7T-10-D-D413. The government has certain rights in the invention.

BACKGROUND OF INVENTION

(1) Field of Invention

The present invention relates to an object detection system and, more specifically, to an object detection and recognition system using both image and size features.

(2) Description of Related Art

Object detection and recognition systems are often employed in autonomous vehicles and reconnaissance systems to quickly and automatically detect and recognize objects within a field-of-view. Traditional object detection and recognition systems attempt to identify the object based on image features of the object. While functional, such systems are limited in their inability to validate the recognition based on size features.

Other attempts to determine size have been made using estimates of a ground-plane. See, for example, Dragon R., Van Gool L., "Ground plane estimation using a hidden Markov model", published at the 27th IEEE conference on computer vision and pattern recognition—CVPR 2014, pp. 4026-4033, Jun. 23-28, 2014, Columbus, Ohio, USA, the entirety of which is incorporated herein by reference. However, this approach can often fail when there are occlusions, shadows or other issues not providing a clear view of open space (e.g., vehicle moving in a wooded area).

Other prior art uses camera calibration to determine object height from an image. See, for example, G. Führ, C. R. Jung and M. B. d. Paula, "On the Use of Calibration for Pedestrian Detection in On-Board Vehicular Cameras," published at the 2016 29th SIBGRAPI Conference on Graphics, Patterns and Images (SIBGRAPI), Sao Paulo, 2016, pp. 80-87, the entirety of which is incorporated herein by reference. Such a calibration approach fails when no camera calibration is available.

Thus, a continuing need exists for an object detection and recognition system that simultaneously learns from image and location data, that is robust to data type and accurate under a variety of target sizes and locations.

SUMMARY OF INVENTION

This disclosure provides an object recognition system. In various embodiments, the system includes one or more processors and a memory. The memory includes executable instructions encoded thereon, such that upon execution of the instructions, the one or more processors perform the operations as described herein. For example, using an integral channel features (ICF) detector, the system extracts a candidate target region (having an associated original confidence score representing a candidate object) from an input image of a scene surrounding a platform. A modified confidence score is generated based on a location and height of detection of the candidate object. The candidate target regions are classified based on the modified confidence score using a trained convolutional neural network (CNN) classifier, resulting in classified objects. The classified objects are tracked using a multi-target tracker for final classification of each classified object as a target or non-target. If the classified object is a target, a device can be controlled based on the target.

In another aspect, the ICF detector computes channel feature vectors for image frames of a video, and wherein, for each image frame, an ICF classifier is applied at multiple image scales and across the entire image frame.

In yet another aspect, the CNN classifier is implemented as interacting software modules comprising a CNN interface and a CNN server, wherein the CNN interface displays results received from the CNN server.

In another aspect, the trained CNN is used for both electro-optical (EO) and infrared (IR) image classification.

In yet another aspect, the input image is divided into a plurality of horizontal bands and ground truth objects are put into a same number of groups based on whether a location of the ground truth objects in the input image is in the band, with the objects in each group being used to estimate the mean and standard deviation of object height distribution in the input image.

In another aspect, generating the modified confidence score uses a weighted Gaussian according to the following equation:

$$f = \exp\left(-\frac{(h-m)^2}{2N\sigma}\right), \text{ and}$$

modified confidence score = original confidence score $* wf$, wherein h denotes a height of the candidate object in the input image, m and σ denote mean and standard deviation, respectively, of object height distribution in the input image and bin, exp(.) denotes an exponential function, N is a multiplier and * denotes multiplication.

In yet another aspect, generating the modified confidence score uses a weighted gate according to the following equation:

$$wf = \begin{cases} 1, & \text{if } \|h-m\| < N\sigma \\ 0, & \text{other ise} \end{cases}, \text{ and}$$

modified confidence score = original confidence score $* wf$, wherein h denotes a height of the candidate object in the input image, m and σ denote mean and standard deviation, respectively, of object height distribution in the input image and bin, N is a multiplier and * denotes multiplication.

In yet another aspect, the one or more processors perform operations of classifying the candidate target regions based on the modified confidence score using a modified convolution network (CNN-2) classifier, resulting in modified classified objects; and fusing the modified classified objects with the classified objects from the trained CNN classifier for processing by the multi-target tracker.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
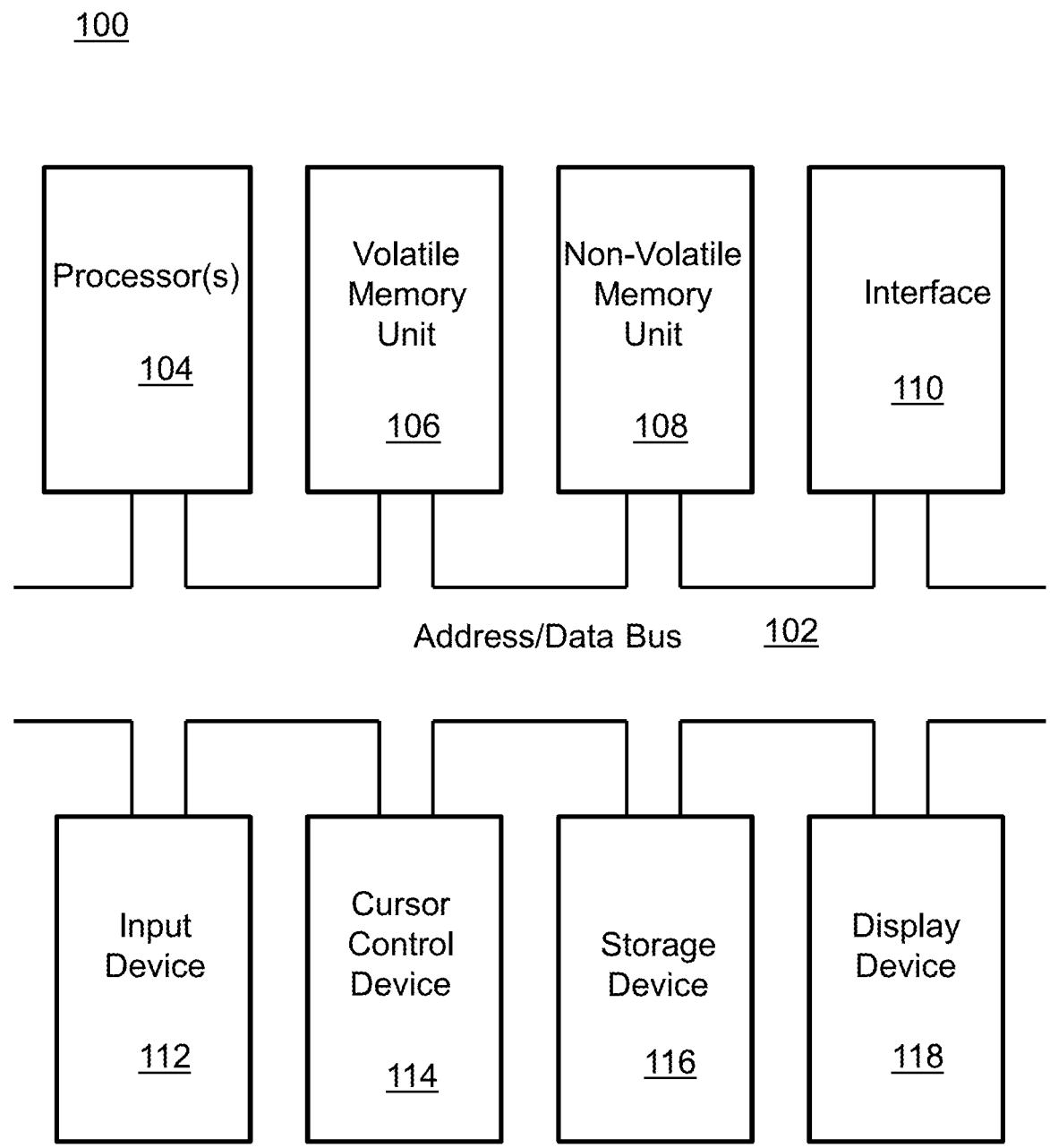
FIG. 1 is a block diagram depicting the components of a system according to various embodiments of the present invention.

The present invention relates to an object detection system and, more specifically, to an object detection and recognition system using both image and size features. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention. Next, specific details of various embodiment of the present invention are provided to give an understanding of the specific aspects. Fourth, an example implementation with experimental results are provided. Finally, example implementations illustrating practical applications of the system are described.

(1) Principal Aspects

Various embodiments of the invention include three "principal" aspects. The first is a system for object detection and recognition. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
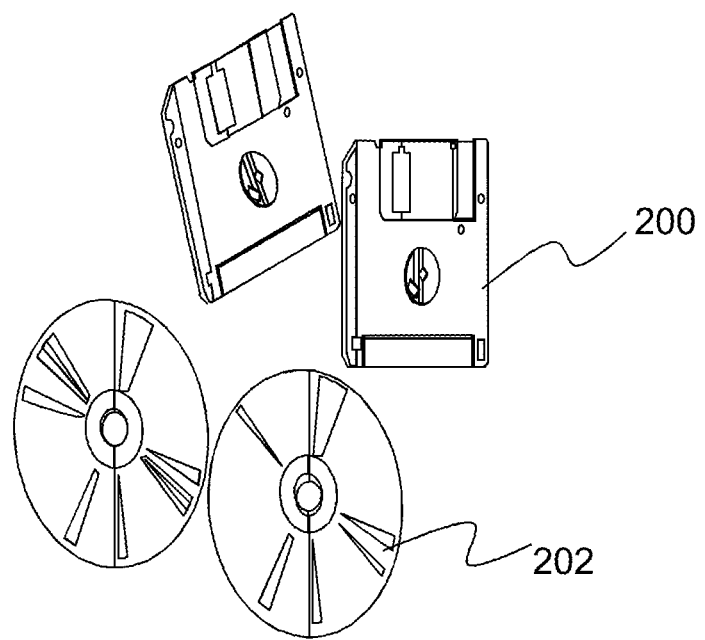
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

The present disclosure provides an object detection and recognition system that uses both image and size/location features. The system extends upon the disclosure of U.S. application Ser. No. 15/883,822, which only used image features. The system of the present disclosure is operable for: 1) learning from image and location data to accurately detect and recognize targets; 2) confidence tuning of detection results based on location data; and 3) combining all of the above into integrated system as a single pipeline. Upon review of the system described below and corresponding performance evaluations, it is evident that this disclosure provides a marked technological improvement to the field and technologies as used for object detection and recognition.

(3) Specific Details of Various Embodiments

Figure 3:
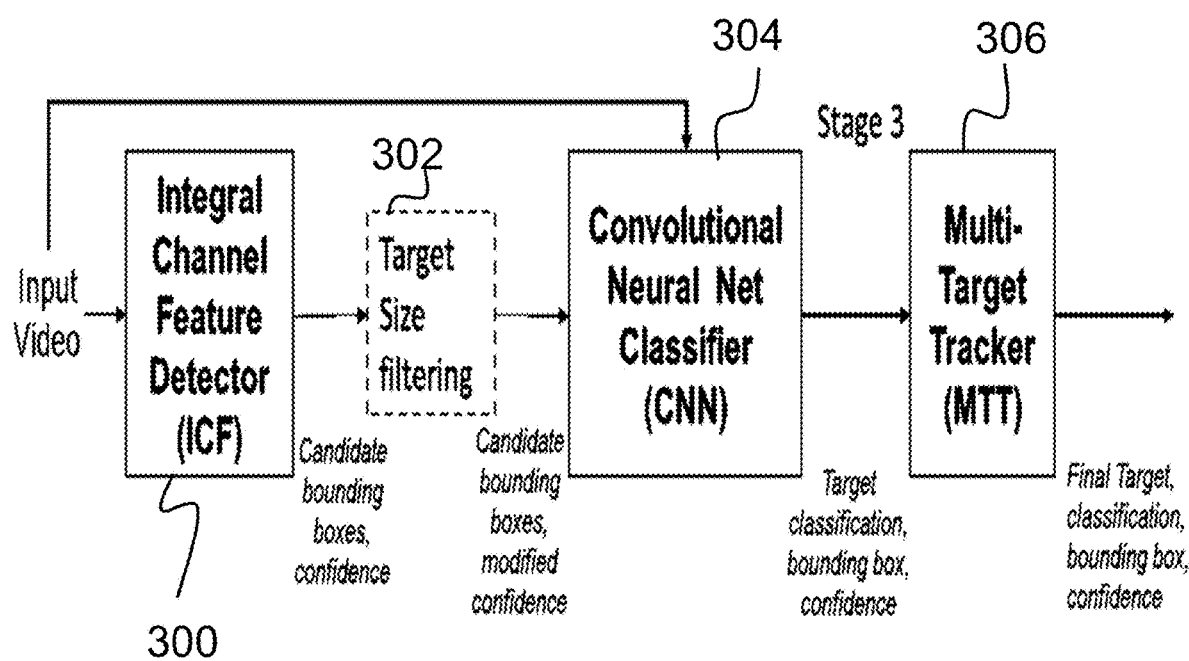
FIG. 3 is a system block diagram according to various embodiments of the present invention.

As shown in FIG. 3, the system of the present disclosure improves upon a three-stage cascaded classifier for target recognition in EO and IR videos from static or moving platforms. Specific details regarding the three-staged classifier can be found in U.S. application Ser. No. 15/883,822. The first stage is an Integral Channel Features (ICF) detector 300 that takes in video and runs a fast detection (e.g., greater than 15 frames per second) to provide high-confidence candidate target regions as bounding boxes and scores (e.g., "MAN" or person target (or other object of interest)) in the video. The ICF is based on agglomeration of "channel features" and the training of small decision trees using these features. Basic features can be thought of as maps from raw pixel values (RGB/IR) to more informative features such as oriented gradients, Haar features, difference of regions or simply color-space transformations. The output of the ICF detector 300 are detected target box locations and associated confidences. The ICF detector 300 computes channel feature vectors for image frames of the video, and each image frame, an ICF classifier is applied at multiple image scales and across the entire image frame.

To be contrasted with the three-stage classifier as described in U.S. application Ser. No. 15/883,822, the system of the present disclosure adds a target size filter 302 to the system. The target size filter 302 is applied to the output of the first stage to affect the confidence scores based on expected versus detected target size box. The candidate bounding boxes with the modified confidence scores are then fed through a second stage, which is a convolutional neural net (CNN) classifier 304 that outputs target class, location and confidences.

In various embodiments, the CNN classifier 304 is implemented as interacting software modules comprising a CNN interface and a CNN server (e.g., one or more processors and corresponding memory), wherein the CNN interface displays results received from the CNN server. The CNN interface takes the candidate target box information from the ICF detector 300 and extracts the image regions from the input video, and hands that off to the CNN server for classification. When the results are received from the CNN server, the CNN interface can display it live and also log the results to disk files and provide the output target boxes for further processing.

The third stage is a multi-target tracker (MTT) 306 that tracks the target boxes from the CNN stage (i.e., the CNN classifier 304) for final target classification, locations and confidence scores. In an alternative embodiment, the tracker results are fed to a comparator for further processing by the CNN stage.

The idea of imposing object size constraints is as follows. When a camera senses a dismount (e.g., "MAN" or person (or other object of interest)) on a flat surface, the height of the subject in the image is directly related to the distance of the subject to the camera, which is reflected in the location of subject's feet in the image. Given the image row where the subject's feet are located in the image, the system can calculate (or predict) the subject's height in the image precisely given the height of the subject, the camera intrinsic, camera height above ground and the camera tilt. By comparing the predicted height and the height of detection boxes in image, the system can provide a confidence of the detection according to how well the two match.

Figure 5:
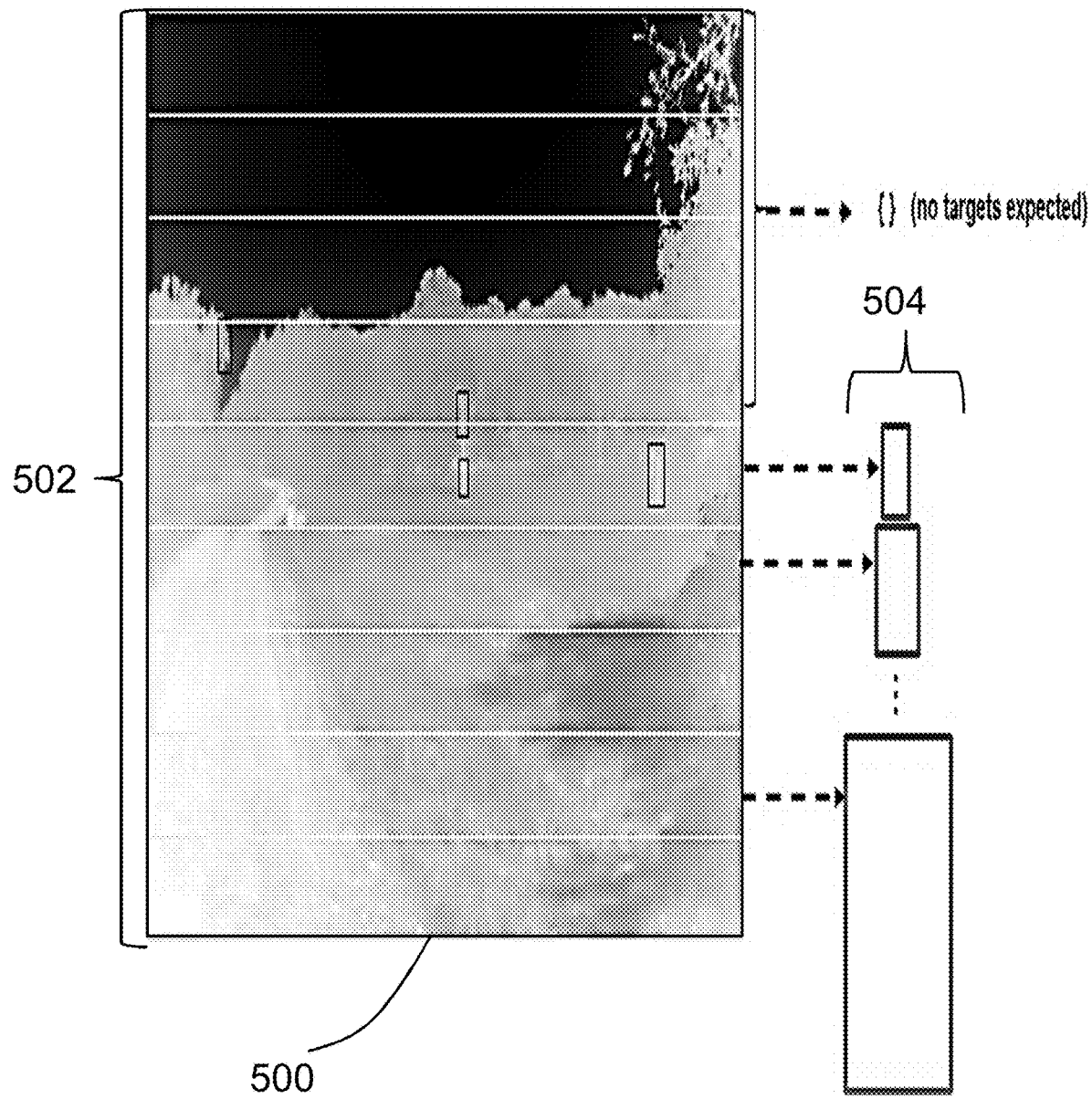
FIG. 5 is an image illustrating an image frame as being divided into N horizontal bands, with the ground truth objects being grouped into N bins.

The system empirically estimates the bottom of object (e.g., feet location) versus object height (i.e., top of object) in the image rather than constructing an analytical formula. In doing so and as shown in FIG. 5, the image frame 500 (e.g., 640×480 pixels) is divided into N (e.g., 16) horizontal bands 502, and the ground truth objects are grouped into N bins 504 according to where the bottom (or feet) of the ground truth box is located in the images. From the group of objects in each bin, the system can estimate their height distribution. For example, a normal (Gaussian) distribution with mean and standard deviation (m, σ) is used to represent this distribution. However, it is often convenient to illustrate the distribution via histogram plots, as described and illustrated.

To use the above empirical height distribution to affect confidence in object detection and thereby improve the system performance, the detector or confidence score coming out of the ICF detector 300 is modified. Post-processing is used to evaluate this approach in terms of its impact on system receiver operating characteristics (ROC) so that no real detector or classification processing is required. This evaluation approach only involves the first two stages (i.e., ICF detector 300 and CNN Classifier 304) along with the target size filter 302, and does not involve the third stage (i.e., MTT 306). To modify the confidence score, the system computes and applies a multiplicative weight factor (wf) on the detection confidence score based on the location and height of the detection. Two methods to compute wf are described further below.

Figure 4A:
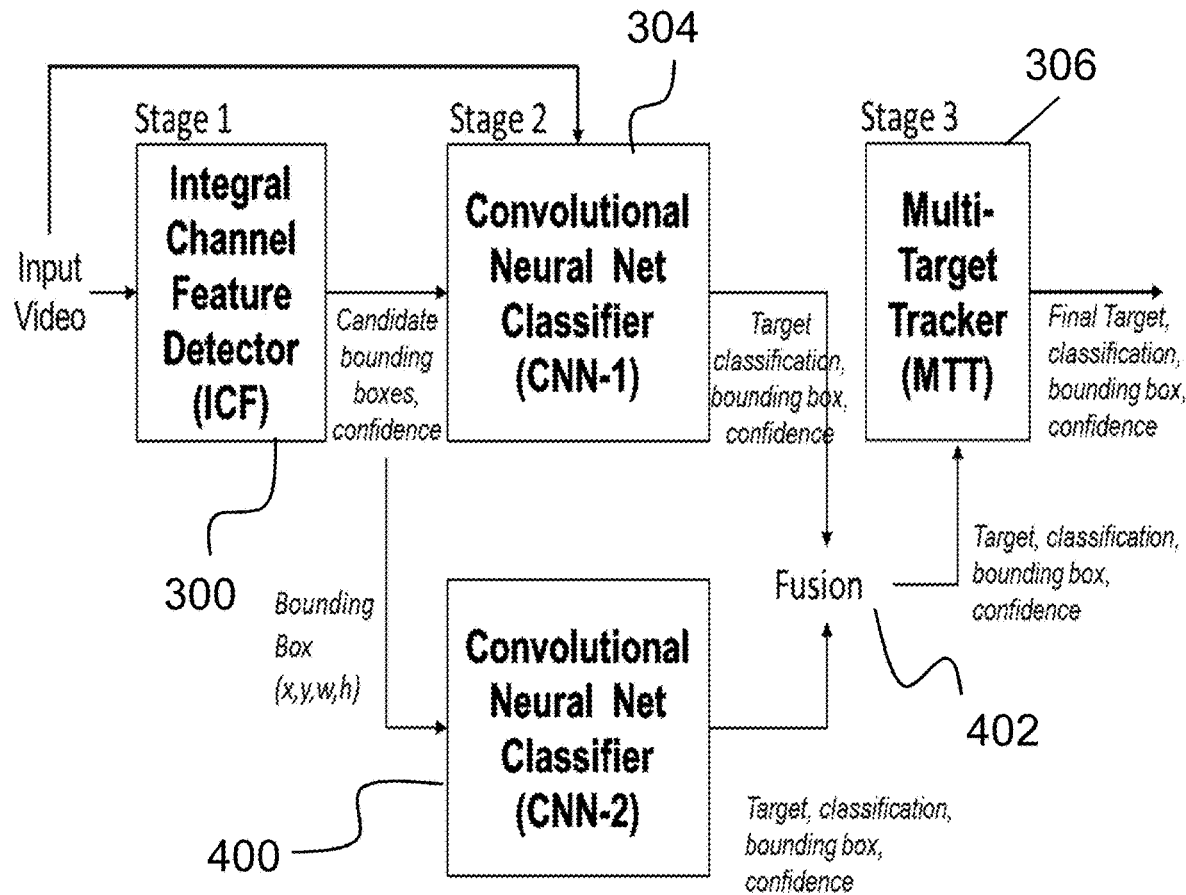
FIG. 4A is a system block diagram according to various embodiments of the present invention.

In a second embodiment and as shown in FIG. 4A, the system learns to predict object class by combining image and location/size information to train an alternative neural network to produce classification results. In this embodiment, the top row processing employs the same deep convolution network (CNN-1) classifier 304 as in Stage 2, whereas the second row employs a modified convolution network (CNN-2) classifier 400. The modified convolution network classifier 400 outputs target class, location and confidences, which are fused 402 with that from the CNN classifier 304 and provided to the MTT 306 that tracks the target boxes for final target classification, locations and confidence scores.

Figure 4B:
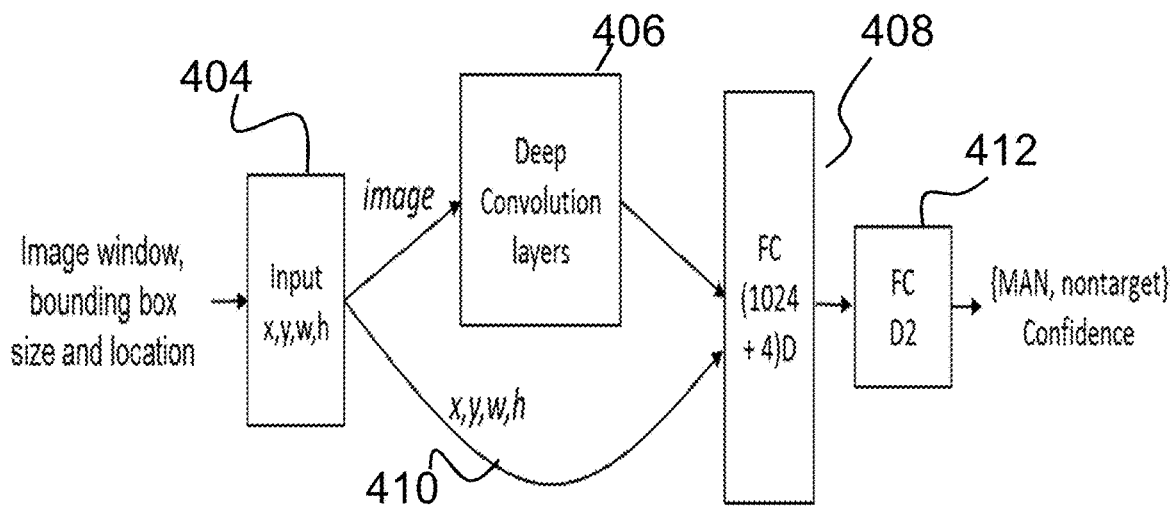
FIG. 4B is a system block diagram depicting a modified convolution network classifier according to various embodiments of the present invention.

The modified convolution network classifier is expanded and further illustrated in FIG. 4B. After receiving the input 404 from the ICF 300, the 1024-D (dimensional) features 408 from the final convolution layer (i.e., deep convolution layers 406) are padded with the target size and location 410 and fed to the fully connected (FC) layer 412 before the classifier layer. The modified CNN-2 400 can be used alongside of the original CNN-1 304 and the results of CNN-1 304 and CNN-2 400 can be fused 402 to arrive at a final decision. Alternatively, CNN-1 304 can be replaced with CNN-2 400 while maintaining the same processing flow. Fusion 402 can be carried out by combining the probability distributions of CNN-1 and CNN-2 over the set of classes to be classified; for example, a simple average of the weights of the classes from the two CNN's and the renormalize to make the sum of weights to 1.0.

(3.1) Method 1: Weighted Gaussian

The first method of modifying the confidence score uses a weighted Gaussian according to the following equation:

$$f = \exp\left(-\frac{(h-m)^2}{2N\sigma}\right),$$

$$\text{new\_score} = \text{original score} * wf,$$

wherein h denotes a height of a detected object in the image whose detection confidence score is to be modified. m and σ denote mean and standard deviation, respectively, of object height distribution in the corresponding image and bin. exp(.) denotes the exponential function. In the case where the histogram corresponding to an image band is missing (i.e., no estimation of m and σ), the multiplicative weight factor (wf) is set to zero (i.e., wf=0.0). Further, N={1, 2, 3, 4 . . . } is a multiplier to relax the detection size constraints. The multiplicative weight factor (wf) is then multiplied with the original score to derive the new and modified confidence score (i.e., new_score).

Figure 6A:
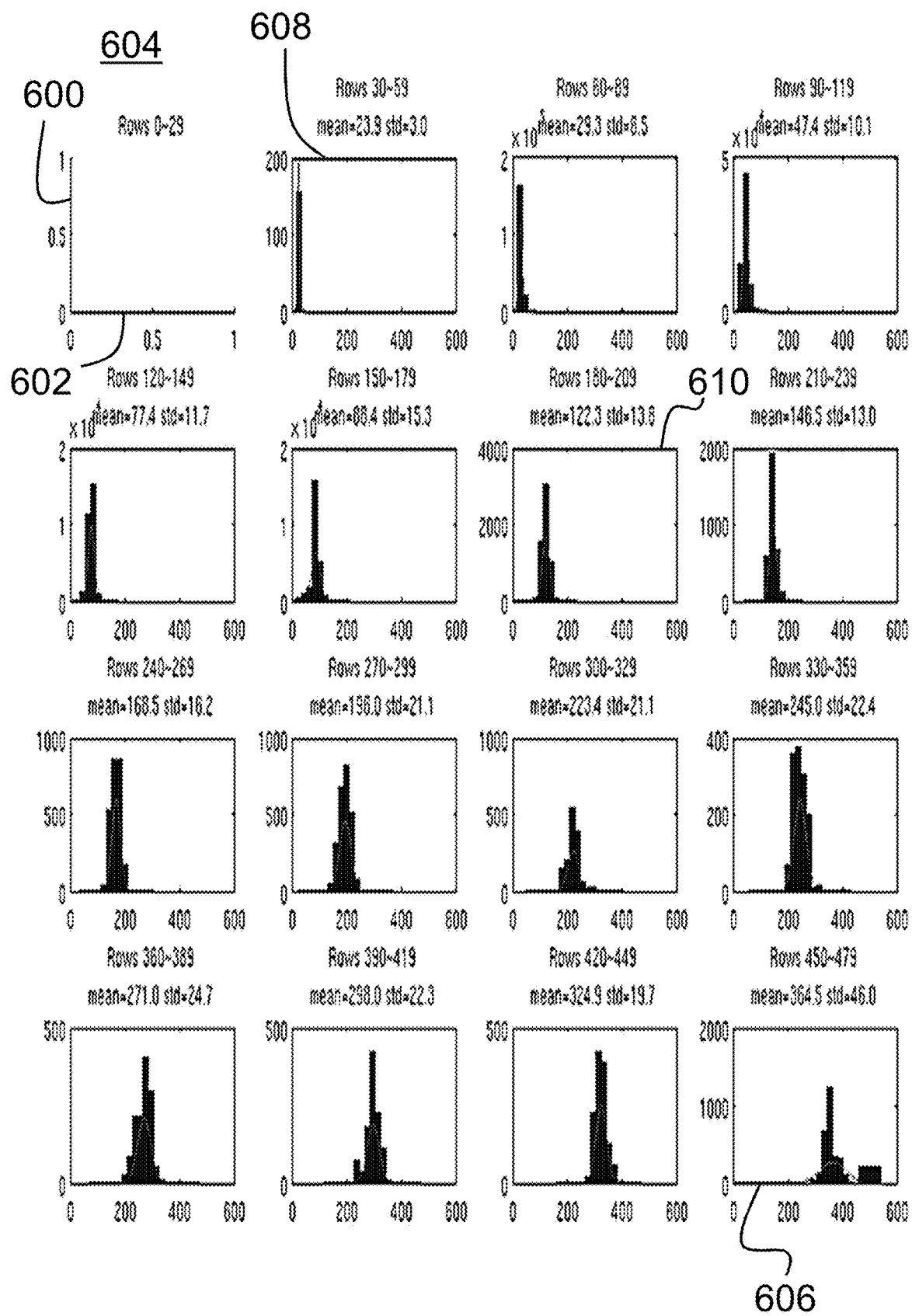
FIG. 6A is an illustration depicting example height distribution of objects in 88 training sequences for a side-facing sensor.
Figure 6B:
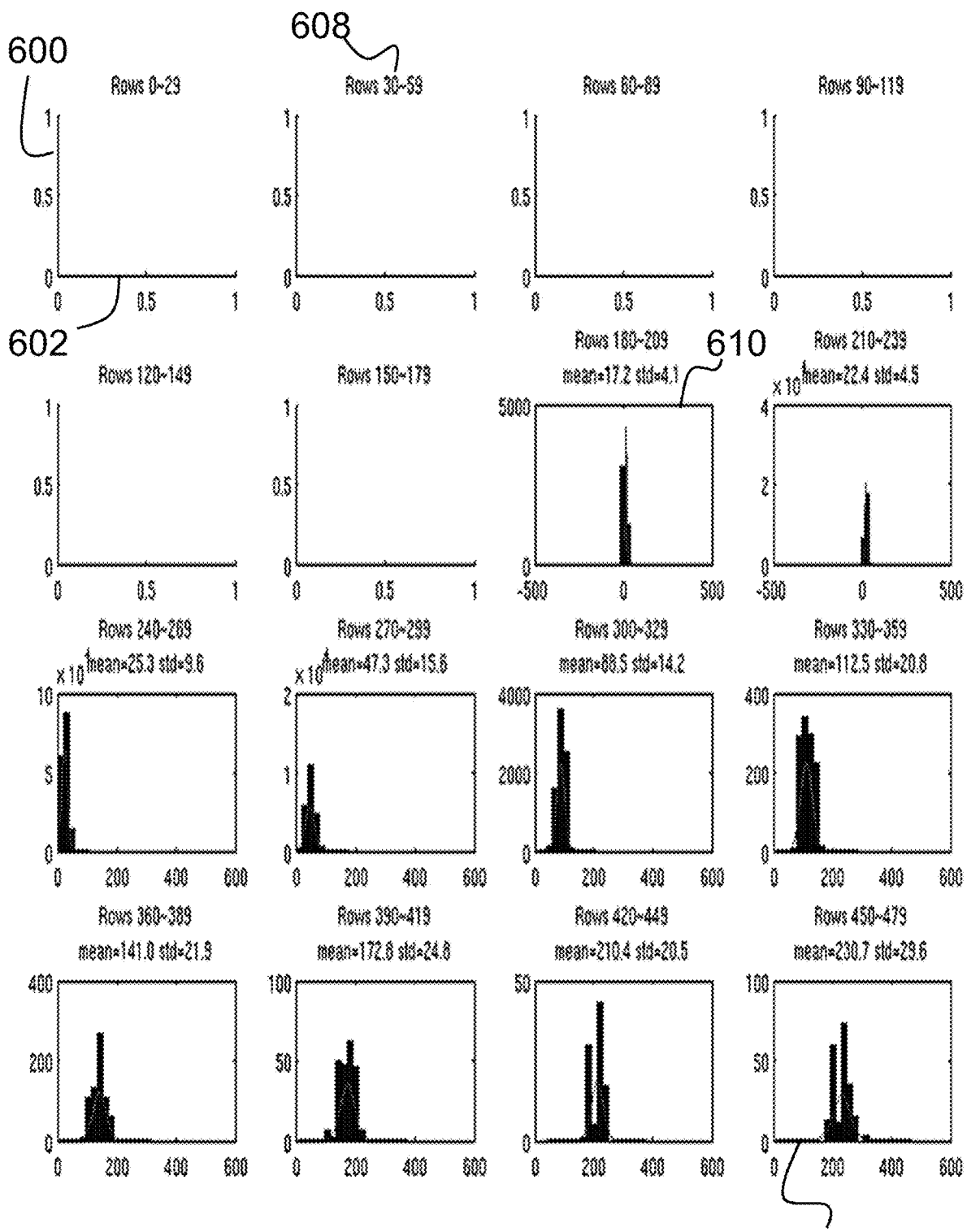
FIG. 6B is an illustration depicting example height distribution of objects in 88 training sequences for a front-facing sensor.

It was determined through experiments that N=1 is too restrictive and does not result in appreciative improvement in system performance, while N=4 provides most of the benefits. FIGS. 6A and 6B show plots 604 depicting the target height 600 distributions of 88 training sequences of the IR data set from side-facing (shown in FIG. 6A) and front-facing (shown in FIG. 6B) sensors, respectively, based on ground truth (GT) information from human annotation. The height distribution 600 is collected in 16 horizontal bands (depicted as 16 plots in each of FIGS. 6A and 6B) across image height of 480 rows, and plotted as 25-bin histograms with their Gaussian approximation (mean and standard deviation). The histograms for each band are labeled with the image rows it covers. Where there are no histograms plotted means there is not sufficient GT target samples to support the histogram estimation for corresponding bands.

For further understanding, FIGS. 6A and 6B illustrate two things. First, when a histogram plot is missing in the corresponding bin, targets appearing in those bins are unlikely regardless of target height. Second, for the bins with histogram plots, the histograms are Gaussian-like. That is, the underlying target heights can be modeled well by Gaussian distributions. As such, once an estimated target height for a particular bin is estimated, the likelihood of the target detection to be true can be estimated based on such distributions. These observations support the approach laid out here for Method 1.

(3.2) Method 2: Weighted Gate

The second method of modifying the confidence score uses a weighted gate according to the following equation:

$$wf = \begin{cases} 1, & \text{if } \|h-m\| < N\sigma \\ 0, & \text{other ise} \end{cases}.$$

This basically gates the detection box height (h) around the mean (m) of the GT box height for the corresponding image band. If the detection height is within the gate, the original score is maintained. Otherwise, the original score is zeroed out, effectively eliminating that detection from further processing. This approach is referred to as "weighted gated". Similar to Method 1, in the case where the histogram corresponding to an image band is missing (i.e., no estimation of m and σ), wf=0. As was the case above, once the multiplicative weight factor (wf) is determined, it is then multiplied with the original score to derive the new and modified confidence score.

Figure 8:
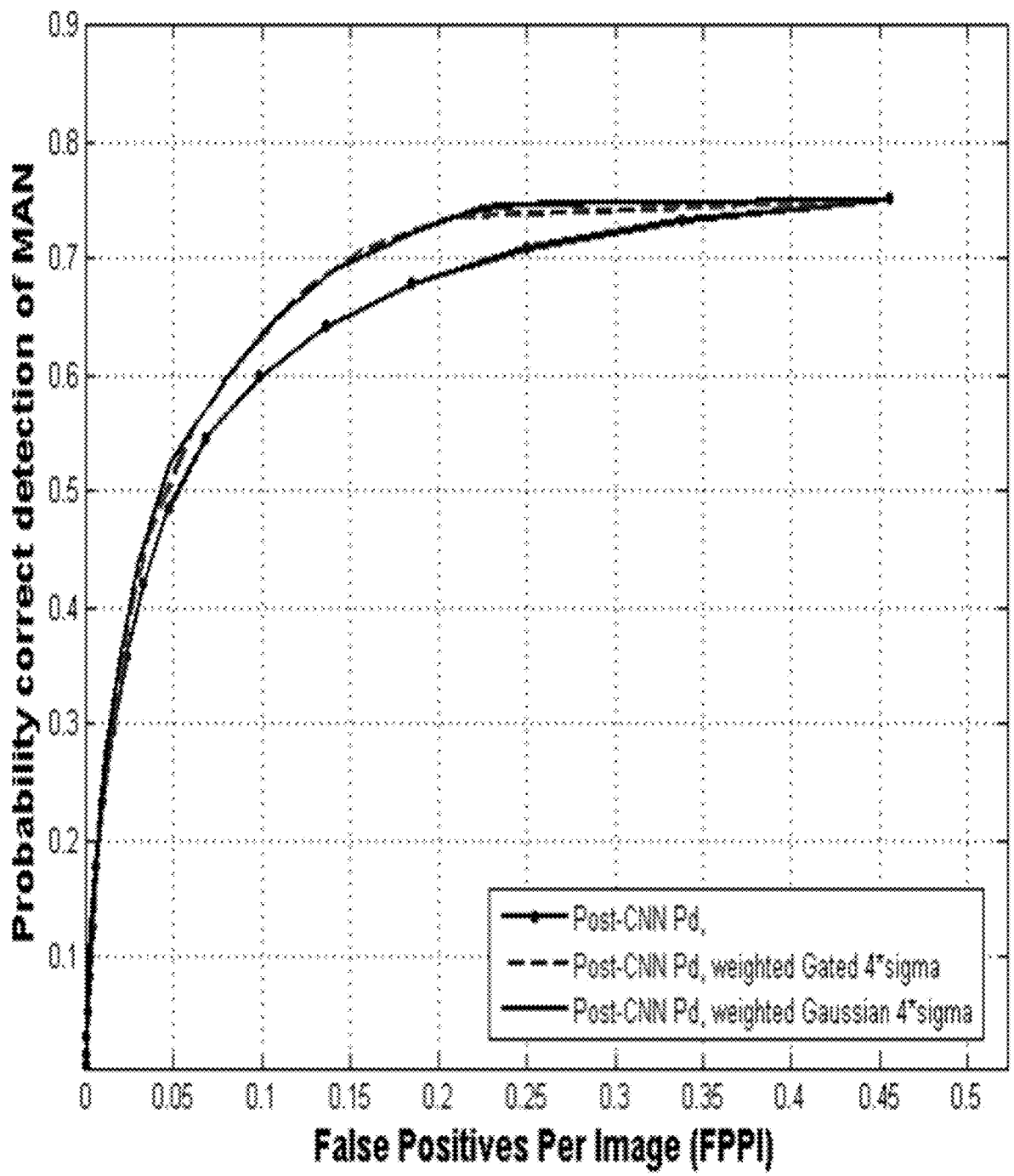
FIG. 8 is a graph illustrating post-CNN (Stage 2) receiver operating characteristics (ROCs) for the Gaussian and gated detection score weight approaches compared with the baseline ROC of unweighted scores.

In experiments, it was found that the "weighted gate" approach was similarly effective in improving the detection performance in terms of ROC when N is >3, while N=1 achieved poor performance. For example, FIG. 8 is a graph illustrating post-CNN (Stage 2) ROCs for the Gaussian and gated detection score weight approaches as compared with the baseline ROC of unweighted scores. As can be seen, both Gaussian and gated approaches performed about the same (for N=4), and are about 5% better than the baseline.

(4) Experimental Results

The embodiment as illustrated in FIG. 3 has been implemented and tested for the task of recognizing dismounts ("MAN" target) and their activities in both EO and IR videos from stationary and moving ground vehicles.

(4.1) IR Video Data

As shown in FIGS. 6A and 6B, a set of IR video sequences was collected from a moving vehicle and the histogram distributions of the height 600 of the ground-truth (GT) boxes for objects 602 were plotted to form a collection of collection of height histogram plots 604. Since the sensors used for side-facing IR sensor and front-facing IR sensor sequences have different tilt angles, the histogram gathering was performed separately for the h1co and h2co sequences. These are shown in FIGS. 6A and 6B discussed before. As can be seen from the histogram plots in FIGS. 6A and 6B, the GT height 600 decreases monotonically from the bottom of the image (rows 450~479) 606 towards the top, and ends in rows 30~59 608 with a mean of 23.9 pixels for h1co, and rows 180~209 610 with a mean of 17.2 for h2co. For both h1co and h2co, the greatest concentration of GT MAN-* objects are located in the 3~4 bands just below the bands with shortest targets listed above.

Figure 7:
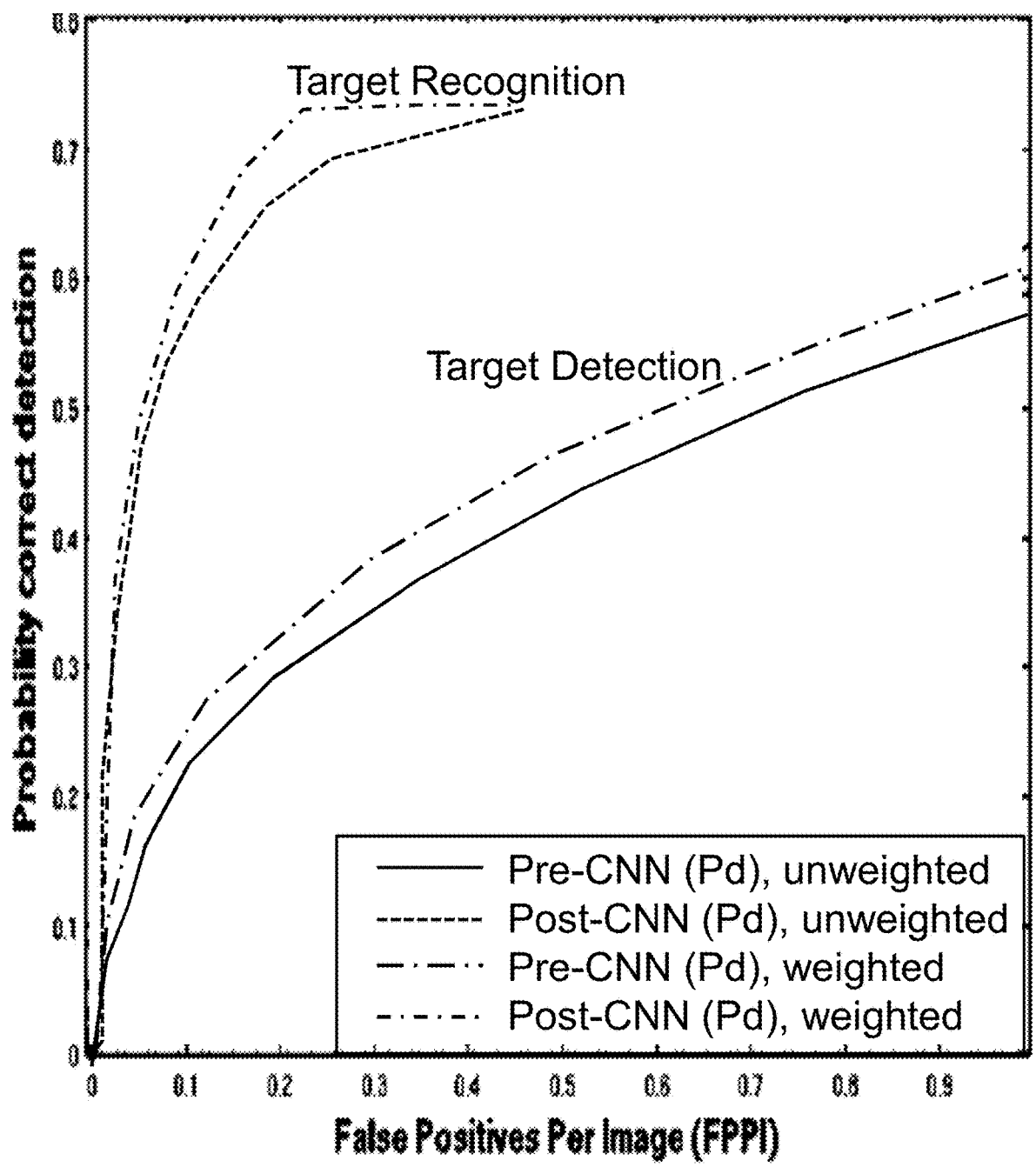
FIG. 7 is a graph illustrating a comparison of detection scores weighted and unweighted for 30 test sequences.

The weight factor wf as described above was computed, and the detection scores were modified using wf. The rest of the pipeline shown in FIG. 3 was performed, with the performances evaluated. Experiments demonstrated how the weighted Gaussian (Method 1) improved the effectiveness of the confidence scores. Specifically, FIG. 7 is a graph illustrating a comparison of detection scores weighted and unweighted for 30 IR test sequences in both Pre-CNN (Stage 1) and Post-CNN (Stage 2) receiver operating characteristic (ROC) curves. Only the Gaussian window approach is shown since the Gated approach (Method 2) achieves almost identical results. As can be seen from these plots in FIG. 7, we get up to 7% (0.07) higher Pd (probability of correct detection) for any given false positive per image (FPPI) or close to 50% reduction in FPPI (e.g., at a little above 75% Pd level).

(4.2) EO Video Data

Figure 9A:
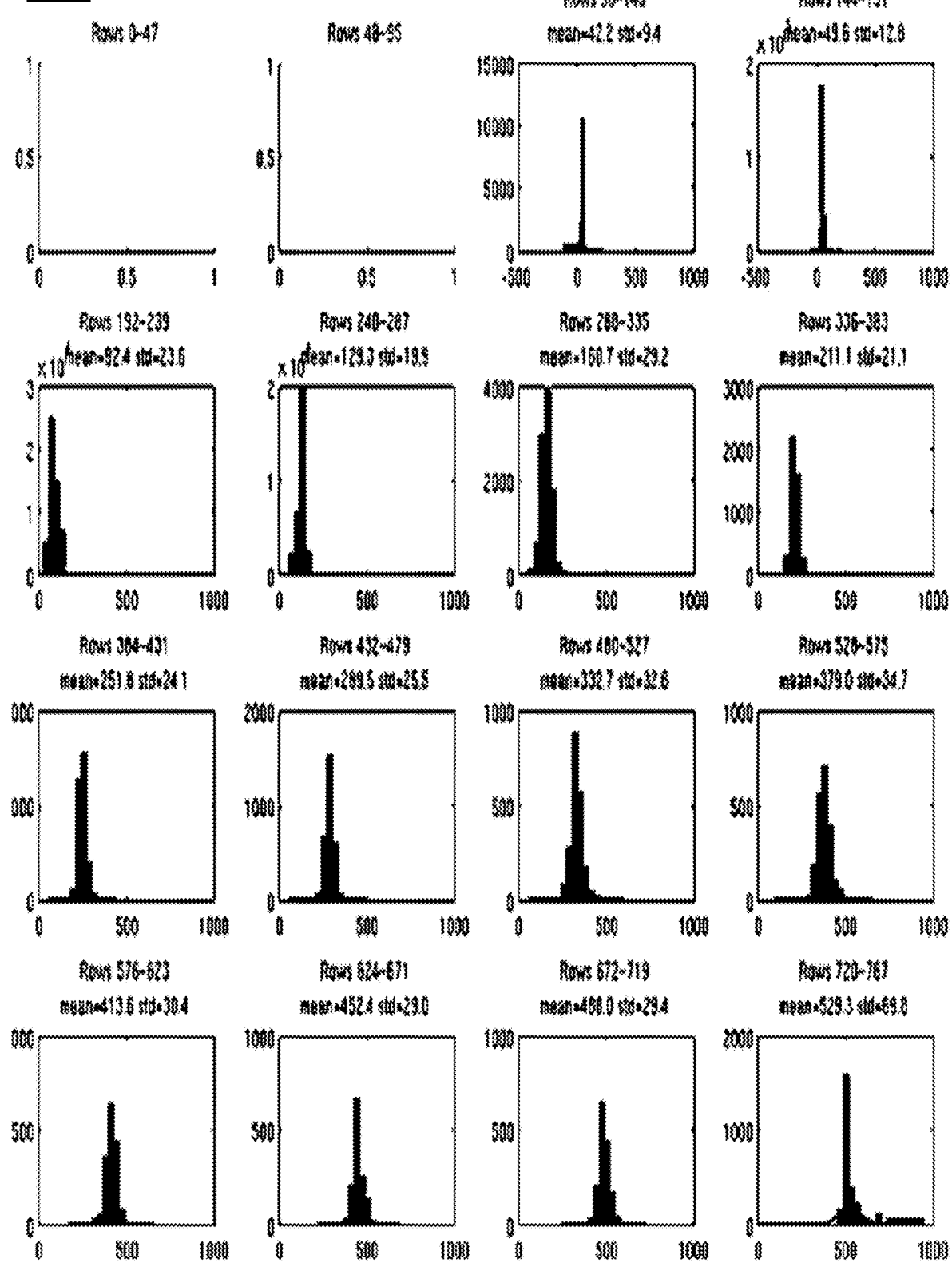
FIG. 9A is an illustration depicting example height distribution of ground truth objects (e.g., a person, a dismount) in 88 training sequences for the side-facing sensors.
Figure 9B:
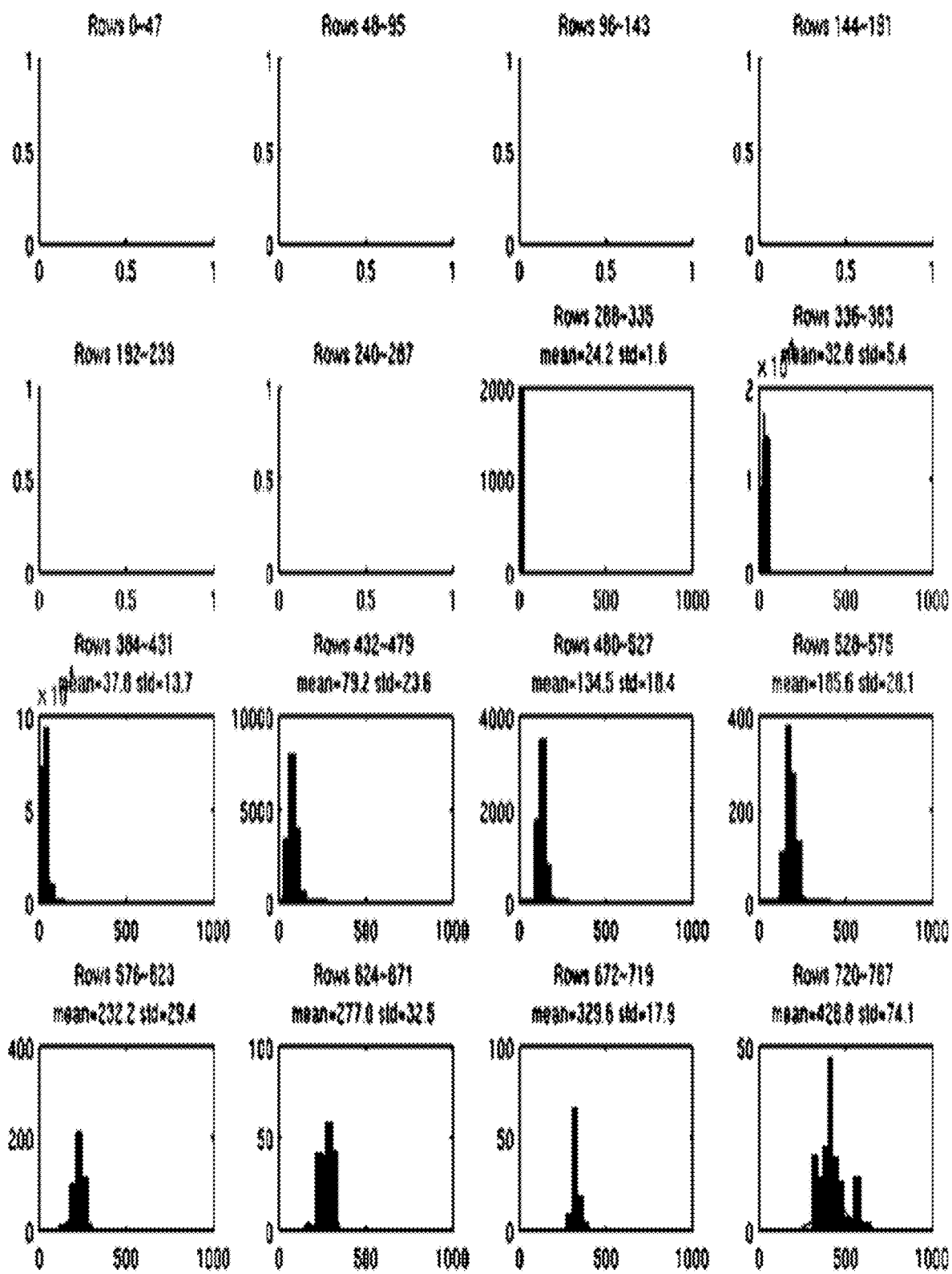
FIG. 9B is an illustration depicting example height distribution of ground truth MAN objects in 88 training sequences for the front facing sensors.

The same experiments and analysis were conducted on visible band (EO) video data. The results are shown in FIGS. 9A and 9B, respectively. Specifically, FIGS. 9A and 9B are graphs (i.e., collection of height histogram plots 900) illustrating height distribution of GT "MAN*" objects in 88 training sequences for side-facing color (or EO) sensors, FIG. 9A) and front-facing EO sensors, FIG. 9B). The height distribution is collected in 16 horizontal bands across image height of 768 rows, and plotted as 25-bin histograms with the Gaussian approximation (from mean and stand deviation) overlaid. The histograms for each band are labeled with the image rows it covers. Where there are no histogram plotted, it means there is not sufficient GT entries to support the histogram estimation.

Figure 10:
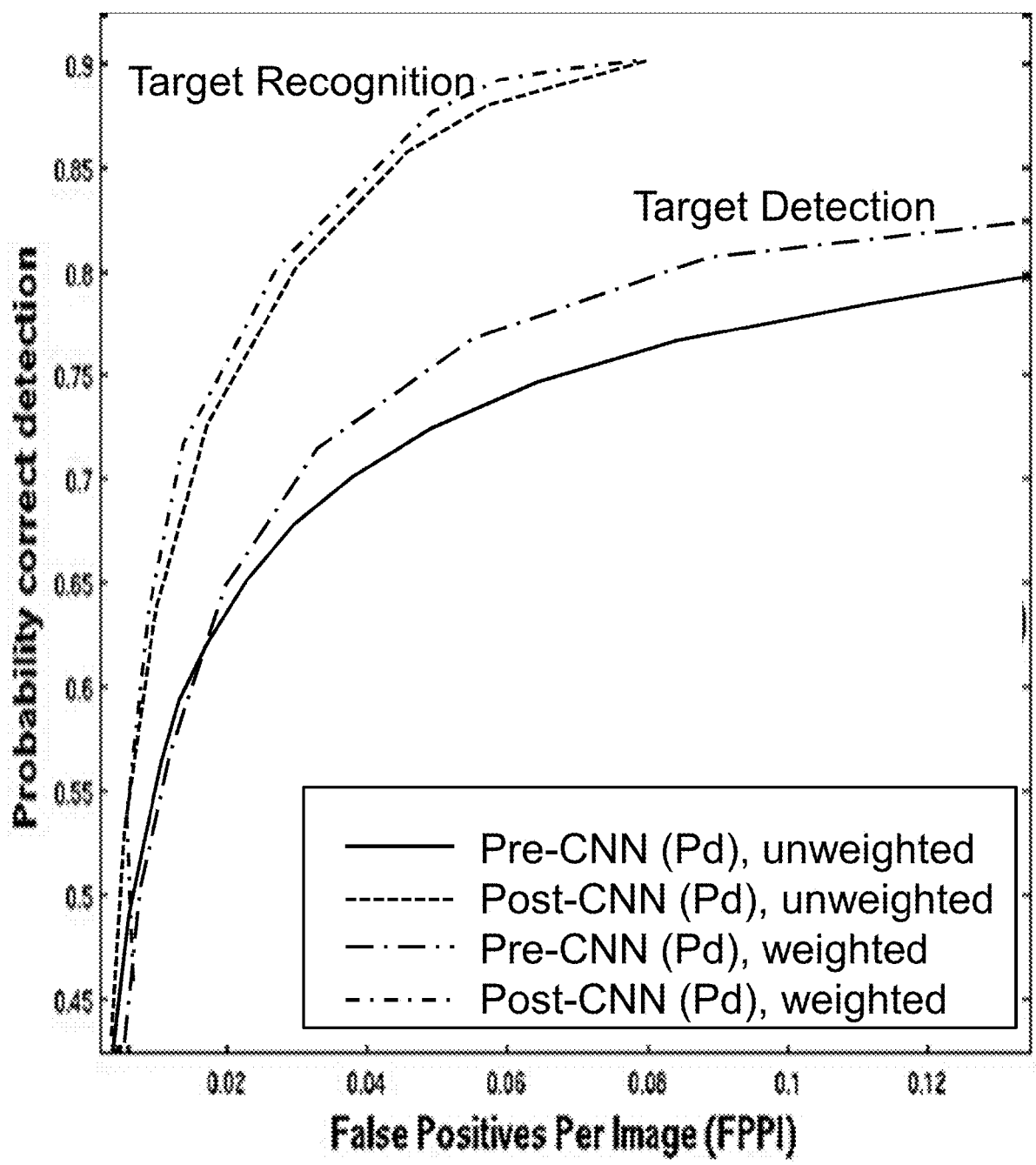
FIG. 10 is a graph illustrating the result comparing detection score weighted versus unweights ROCs for 30 EO test sequences in both the Pre-CNN (Stage 1+size filtering) and Post-CNN (Stage 2) results.

These histograms do not look much different than those from IR sequences as presented in the previous section (see FIGS. 6A and 6B). The trend is the same though the specific numbers differ: as the targets move closer to the sensor (the target box's bottom edges move closer to the bottom of the image) the height of target appears larger as represented by the mean of the plots. The estimated distributions shown in FIGS. 9A and 8B were used to weight the MAN object detection scores in the same way as discussed for IR images. FIG. 10 shows the result comparing detection score weighted versus unweights ROCs for 30 EO test sequences in both the Pre-CNN (Stage 1+size filtering) and Post-CNN (Stage 2) results. As can be seen, the detection ROC (pre-CNN) from weighted scores has ~4% performance advantage higher than the unweighted ROC, but the benefit almost disappears for Post-CNN ROC. It is hypothesized that this happens because the CNN trained in EO is performing very well already, and there is little the improved detection can help further improve the situation. This is contrary to the IR case. The CNN in IR domain is not as good as the one in EO, because the target objects tend to be smaller and contain less distinguishing texture.

Thus, described above is an object detection and recognition system that improves upon the work described in U.S. application Ser. No. 15/883,822 with the addition of detection size filtering. The experiments showed positive improvements on overall detection performance (5~7% in Pd, and close to 50% reduction in FPPI) both before (i.e. with Stage 1 only) and after CNN recognition (with Stages 1 and 2) compared with the baseline according to system ROCs.

(5) Control of a Device

The invention described herein allows EO or IR vision-based object/target recognition in real-time even on small, low power, low cost platform (such UAVs and UGVs). This approach is also amenable for implementation on emerging spiking neuromorphic hardware, for example, a neuromorphic chip. The system according to embodiments of the present disclosure can be used in intelligence, surveillance, and reconnaissance (ISR) operations, border security, and mission safety, such as for UAV based surveillance, human activity detection, threat detection, and distributed mobile operations. For example, for a military application, the classified object output can be used to alert (via audible, tactile, and/or visual alert, etc.) the driver/team that there is a high-confidence "MAN" target and its location. The vehicle can then take evasive action by causing the vehicle to change route, etc., or attack that target after manual confirmation of its danger. For a remotely operated vehicle, it can also provide a similar alert.

Additionally, the system can be embedded in autonomous robotic vehicles, such as UAVs and UGVs, and self-driving vehicles. For instance, in a self-driving vehicle, the system can be used for collision avoidance. In this example, if the system detects an object (target) in its path (e.g., a pedestrian, another vehicle), an alert is sent to the vehicle operating system to cause the vehicle to perform a braking operation. Alternatively, the alert may signal that the vehicle operating system should perform a swerving motion around the object (target), involving steering and accelerating operations or any other operations as required to provide for collision avoidance. Further, the object detected may be a road sign, such as a stop sign. Upon classification of the stop sign, an alert can be sent to the vehicle operating system causing the vehicle to brake or otherwise adhere to the message as conveyed by the road sign. Therefore and as noted above, the system and process described herein can be used to control a variety of devices, such as causing said device to perform an operation or physical maneuver.

Figure 11:
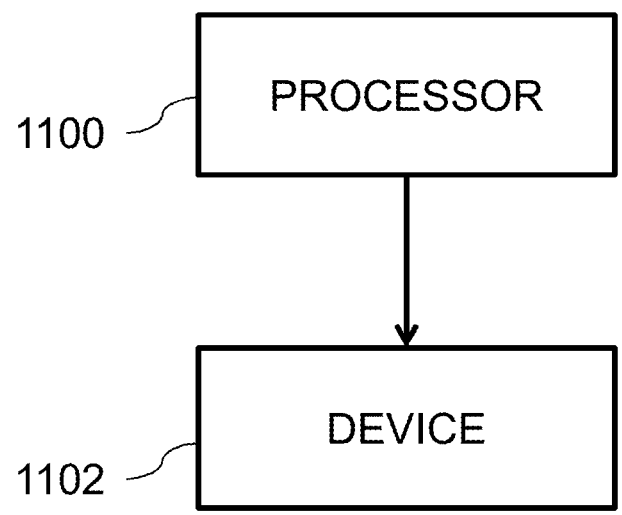
FIG. 11 is a block diagram depicting control of a device according to various embodiments.

FIG. 11 is a flow diagram illustrating using a processor 1100 to control a device 1102 based on classification of an object as a target. Non-limiting examples of devices 1102 that can be controlled via the processor 1100 and the classification of the target object include a vehicle or a vehicle component, such as a brake, acceleration/deceleration controls, a steering mechanism, suspension, or safety device (e.g., airbags, seatbelt tensioners, etc.), or any combination thereof. Further, the vehicle could be an unmanned aerial vehicle (UAV), an autonomous ground vehicle, or a human operated vehicle controlled either by a driver or by a remote operator. As can be appreciated by one skilled in the art, control of other device types is also possible given classification of an object as a target and the corresponding circumstances in which the system is employed.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. An object recognition system, the system comprising:
one or more processors and a non-transitory computer-readable medium having executable instructions encoded thereon such that when executed, the one or more processors perform operations of:
using an integral channel features (ICF) detector, extracting a candidate target region from an input image of a scene surrounding a platform, wherein the candidate target region has an associated original confidence score representing a candidate object, wherein the input image is divided into a plurality of horizontal bands and ground truth objects are put into a same number of groups based on whether a location of the ground truth objects in the input image is in a band, with the objects in each group being used to estimate mean and standard deviation of object height distribution in the input image;
generating a modified confidence score based on a location and height of detection of the candidate object;
classifying the candidate target regions based on the modified confidence score using a trained convolutional neural network (CNN) classifier, resulting in classified objects;
using a multi-target tracker, tracking the classified objects for final classification of each classified object as a target or non-target; and if the classified object is a target, then alerting security personnel via a displayed visual alert.

2. The system as set forth in claim 1, wherein the ICF detector computes channel feature vectors for image frames of a video, and wherein, for each image frame, an ICF classifier is applied at multiple image scales and across the entire image frame.

3. The system as set forth in claim 1, wherein the CNN classifier is implemented as interacting software modules comprising a CNN interface and a CNN server, wherein the CNN interface displays results received from the CNN server.

4. The system as set forth in claim 1, wherein the trained CNN is used for both electro-optical (EO) and infrared (IR) image classification.

5. An object recognition system, the system comprising:
one or more processors and a non-transitory computer-readable medium having executable instructions encoded thereon such that when executed, the one or more processors perform operations of:
using an integral channel features (ICF) detector, extracting a candidate target region from an input image of a scene surrounding a platform, wherein the candidate target region has an associated original confidence score representing a candidate object;
generating a modified confidence score based on a location and height of detection of the candidate object;
classifying the candidate target regions based on the modified confidence score using a trained convolutional neural network (CNN) classifier, resulting in classified objects;
using a multi-target tracker, tracking the classified objects for final classification of each classified object as a target or non-target; and
if the classified object is a target, then alerting security personnel via a displayed visual alert; and
wherein generating the modified confidence score uses a weighted Gaussian according to the following equation:

$$wf = \exp\left(-\frac{(h-m)^2}{2N\sigma^2}\right), \text{ and}$$

modified confidence score = original confidence score $* wf$, wherein h denotes a height of the candidate object in the input image, m and σ denote mean and standard deviation, respectively, of object height distribution in the input image and bin, exp(.) denotes an exponential function, N is a multiplier and * denotes multiplication.

6. An object recognition system, the system comprising:
one or more processors and a non-transitory computer-readable medium having executable instructions encoded thereon such that when executed, the one or more processors perform operations of:
using an integral channel features (ICF) detector, extracting a candidate target region from an input image of a scene surrounding a platform, wherein the candidate target region has an associated original confidence score representing a candidate object;
generating a modified confidence score based on a location and height of detection of the candidate object;
classifying the candidate target regions based on the modified confidence score using a trained convolutional neural network (CNN) classifier, resulting in classified objects;
using a multi-target tracker, tracking the classified objects for final classification of each classified object as a target or non-target; and
if the classified object is a target, then alerting security personnel via a displayed visual alert; and
wherein generating the modified confidence score uses a weighted gate according to the following equation:

$$wf = \begin{cases} 1, & \text{if } \|h-m\| < N\sigma \\ 0, & \text{otherwise} \end{cases}, \text{ and}$$

modified confidence score = original confidence score $* wf$, wherein h denotes a height of the candidate object in the input image, m and σ denote mean and standard deviation, respectively, of object height distribution in the input image and bin, N is a multiplier and * denotes multiplication.

7. The system as set forth in claim 1, further comprising operations of:
classifying the candidate target regions based on the modified confidence score using a modified convolution network (CNN-2) classifier, resulting in modified classified objects; and
fusing the modified classified objects with the classified objects from the trained CNN classifier for processing by the multi-target tracker.

8. A computer program product for object recognition the computer program product comprising:
a non-transitory computer-readable medium having executable instructions encoded thereon, such that upon execution of the instructions by one or more processors, the one or more processors perform operations of:
using an integral channel features (ICF) detector, extracting a candidate target region from an input image of a scene surrounding a platform, wherein the candidate target region has an associated original confidence score representing a candidate object, wherein the input image is divided into a plurality of horizontal bands and ground truth objects are put into a same number of groups based on whether a location of the ground truth objects in the input image is in a band, with the objects in each group being used to estimate mean and standard deviation of object height distribution in the input image;
generating a modified confidence score based on a location and height of detection of the candidate object;
classifying the candidate target regions based on the modified confidence score using a trained convolutional neural network (CNN) classifier, resulting in classified objects;
using a multi-target tracker, tracking the classified objects for final classification of each classified object as a target or non-target; and
if the classified object is a target, then controlling a device based on the target.

9. The computer program product as set forth in claim 8, wherein the ICF detector computes channel feature vectors for image frames of a video, and wherein, for each image frame, an ICF classifier is applied at multiple image scales and across the entire image frame.

10. The computer program product as set forth in claim 8, wherein the CNN classifier is implemented as interacting software modules comprising a CNN interface and a CNN server, wherein the CNN interface displays results received from the CNN server.

11. The computer program product as set forth in claim 8, wherein the trained CNN is used for both electro-optical (EO) and infrared (IR) image classification.

12. The computer program product as set forth in claim 8, wherein generating the modified confidence score uses a weighted Gaussian according to the following equation:

$$wf = \exp\left(-\frac{(h-m)^2}{2N\sigma}\right), \text{ and}$$

modified confidence score = original confidence score $* wf$, wherein h denotes a height of the candidate object in the input image, m and σ denote mean and standard deviation, respectively, of object height distribution in the input image and bin, exp(.) denotes an exponential function, N is a multiplier and * denotes multiplication.

13. The computer program product as set forth in claim 8, wherein generating the modified confidence score uses a weighted gate according to the following equation:

$$wf = \begin{cases} 1, & \text{if } \|h-m\| < N\sigma \\ 0, & \text{otherwise} \end{cases}, \text{ and}$$

modified confidence score = original confidence score $* wf$, wherein h denotes a height of the candidate object in the input image, m and σ denote mean and standard deviation, respectively, of object height distribution in the input image and bin, N is a multiplier and * denotes multiplication.

14. The computer program product as set forth in claim 8, further comprising operations of:
classifying the candidate target regions based on the modified confidence score using a modified convolution network (CNN-2) classifier, resulting in modified classified objects; and
fusing the modified classified objects with the classified objects from the trained CNN classifier for processing by the multi-target tracker.

15. A computer implemented method for object recognition, the method comprising an act of:
using an integral channel features (ICF) detector, extracting a candidate target region from an input image of a scene surrounding a platform, wherein the candidate target region has an associated original confidence score representing a candidate object, wherein the input image is divided into a plurality of horizontal bands and ground truth objects are put into a same number of groups based on whether a location of the ground truth objects in the input image is in a band, with the objects in each group being used to estimate mean and standard deviation of object height distribution in the input image;
generating a modified confidence score based on a location and height of detection of the candidate object;
classifying the candidate target regions based on the modified confidence score using a trained convolutional neural network (CNN) classifier, resulting in classified objects;
using a multi-target tracker, tracking the classified objects for final classification of each classified object as a target or non-target; and
if the classified object is a target, then controlling a device based on the target.

16. The method as set forth in claim 15, wherein the ICF detector computes channel feature vectors for image frames of a video, and wherein, for each image frame, an ICF classifier is applied at multiple image scales and across the entire image frame.

17. The method as set forth in claim 15, wherein the CNN classifier is implemented as interacting software modules comprising a CNN interface and a CNN server, wherein the CNN interface displays results received from the CNN server.

18. The method as set forth in claim 15, wherein the trained CNN is used for both electro-optical (EO) and infrared (IR) image classification.

19. The method as set forth in claim 15, wherein generating the modified confidence score uses a weighted Gaussian according to the following equation:

$$wf = \exp\left(-\frac{(h-m)^2}{2N\sigma}\right), \text{ and}$$

modified confidence score = original confidence score $* wf$, wherein h denotes a height of the candidate object in the input image, m and σ denote mean and standard deviation, respectively, of object height distribution in the input image and bin, exp(.) denotes an exponential function, N is a multiplier and * denotes multiplication.

20. The method as set forth in claim 15, wherein generating the modified confidence score uses a weighted gate according to the following equation:

$$wf = \begin{cases} 1, & \text{if } \|h-m\| < N\sigma \\ 0, & \text{otherwise} \end{cases}, \text{ and}$$

modified confidence score = original confidence score $* wf$, wherein h denotes a height of the candidate object in the input image, m and σ denote mean and standard deviation, respectively, of object height distribution in the input image and bin, N is a multiplier and * denotes multiplication.

21. The method as set forth in claim 15, further comprising acts of:
classifying the candidate target regions based on the modified confidence score using a modified convolution network (CNN-2) classifier, resulting in modified classified objects; and
fusing the modified classified objects with the classified objects from the trained CNN classifier for processing by the multi-target tracker.

* * * * *